Figure 1:
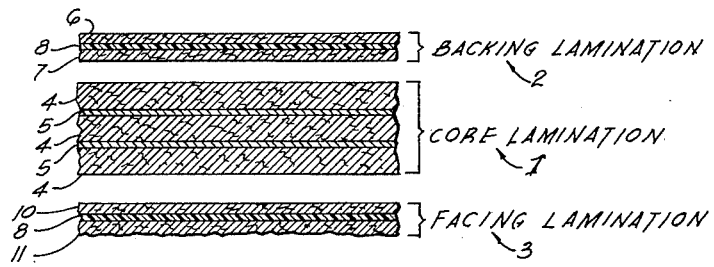

July 3, 1962 W. V. SHEARER ET AL 3,042,563
DECORATIVE LAMINATED PAPER BOARD AND
THE METHOD FOR ITS PRODUCTION
Filed Nov. 13, 1959 2 Sheets-Sheet 1

INVENTORS
WALTER V. SHEARER
GARRISON HOUSEHOLDER
BY
Cleveland B. Hollabaugh
ATTORNEY.

3,042,563
DECORATIVE LAMINATED PAPER BOARD AND THE METHOD FOR ITS PRODUCTION
Walter V. Shearer, West Springfield, and Garrison Householder, Granby, Mass., assignors to The Plastic Coating Corporation
Filed Nov. 13, 1959, Ser. No. 852,781
14 Claims. (Cl. 154—45.9)

This invention relates to a decorative laminated paper board and to the method for its production. More particularly, it relates to a decorative laminated paper board which is suitable for use as interior trim for vehicle bodies. This decorative laminated paper board is especially suitable for use as interior linings of the tops of various types of vehicles.

In the production of paper sheets on a Fourdrinier machine, or on a cylinder machine, the cellulosic fibers of the paper pulp become generally oriented with their lengths in the direction of travel through the paper machine. This orientation of the cellulosic fibers in the paper sheet causes it to have different physical characteristics in the machine direction, as compared with those in the cross-machine direction. On the other hand, it undergoes considerably greater dimension changes in the cross machine direction, than in the machine direction with changes in its moisture content. The change in dimension in the cross-machine direction can be four to six fold that in the machine direction, with a given change in the moisture content of the sheets.

In the preparation of laminations of two or more sheets of paper, it is the usual practice to keep the machine direction of the various sheets forming the lamination parallel to each other, rather than at right angles to each other. The parallel alignments of the machine directions of the various sheets of a lamination is required to cause the lamination to remain flat with changes in the relative humidity of its environment. Right angle alignments of the machine directions of the sheets will cause the lamination to curl with changes in relative humidity due to the differences in the dimensional changes of the different plies of the lamination in a given direction across the lamination. This requirement, arising from the differences in the changes in the dimensions of a sheet with changes in moisture content, has made it necessary to forego the improved physical properties which could otherwise be obtained by positioning the plies of a lamination with their machine directions at right angles to each other.

Decorative laminated paper board panels are coming into widespread use as interior lining of the tops of different types of automotive vehicles, and are usually referred to as "head liners." In such use, the decorative laminated paper board panels have had a tendency to sag, giving the head liner an irregular contour which is unsightly. Decorative laminated paper board panels have heretofore been produced by laminating a plurality of plies of paper board by adhering them together with a suitable adhesive, laminating a finishing sheet of paper to one or both outer surfaces of the paper board by an intermediate film of polyethylene and then decorating the outer surface of the sheet which has been laminated by the polyethylene to the paper board. In this procedure, each of the plies of paper board and the final sheet of paper must inherently be positioned with their machine-directions parallel to each other.

This procedure for producing a decorative laminated paper board panel cannot take advantage of the possibility of obtaining improved physical properties by positioning the machine directions of various of the plies at right angles to each other. Further, it has a disadvantage arising from the fact that in steps of laminating the finishing sheet of paper to the surface of the composite paper board and of decorating the outer surface of the finishing sheet must be carried out at relatively slow speeds due to the thickness, weight and stiffness of the paper board core.

It is an abject of this invention to provide decorated laminated paper board panels which are adapted for use as decorative trim panels, and particularly, as head liners in the bodies of automotive vehicles which is resistant to sagging in a horizontal or near horizontal position.

A further object is to provide a method for the production of a decorated laminated paper board panel in which the step or steps which are carried out to produce a decorated surface can be carried out at far higher speeds than has heretofore been possible in the production of such panels.

Other objects and the various advantageous features provided by this invention will become apparent from the detailed description of this invention which follows.

The decorative laminated paper board, in accordance with this invention, comprises a center core of a plurality of plies of thick paper or thin paper board adhered together by means of a waterproof adhesive to form a relatively stiff laminated paper board which carries on each of its outer surfaces a lamination of a continuous water-impervious film of a flexible, thermoplastic resin between two sheets of paper. The sheets of paper of one of these laminations which will be termed the "backing laminate" are undecorated, i.e., smooth sheets. The other lamination which will be termed the "facing laminate" consists of one undecorated sheet of paper on one side of the flexible, thermoplastic resin film and an embossed or otherwise decorated sheet of paper on its other side. Both the facing laminate and the backing laminate are affixed, respectively, to the opposite surfaces of the laminated paper board forming the center core by a layer of a waterproof adhesive.

The various paper board plies of the core of this decorated laminated board are positioned in this lamination with their machine directions parallel. The two sheets of paper of the facing laminate and of the backing laminate have their machine directions parallel to each other. Both the facing laminate and the backing laminate may have their machine directions at right angles to the machine directions of the other sheets of the completed laminated board. On the other hand, the backing laminate may be positioned with its machine direction parallel to the machine directions of the plies of the paper board core, while the facing laminate is positioned with the machine direction of its plies of right angles to the machine directions of the plies of the paper board core.

In the completed decorative laminated board in accordance with this invention, the paper sheets of the laminate or laminates which have their machine directions at right angles to the machine directions of the plies of the core are under tension in their cross-machine direction, with a resultant stress between that laminate and the plies of the core lamination. In the embodiment of this invention in which both the backing and the facing laminate have their machine directions at right angles to the machine directions of the plies of the core, the tensions of these two outer laminates substantially balance each other and the laminated board may be termed a "balanced board." The balancing of the tensions of the two outer laminations permits the board to remain flat. In the alternative embodiment, in which only the facing laminate is positioned with its machine direction at right angles to the machine directions of the plies of the core and of the backing laminate, the board is under an unbalanced stress due to the tension of the facing laminate and therefore the laminated board may be termed an "unbalanced board." In the case of the unbalanced board, the tension of the facing laminate, causes the board to assume a very slight, almost imperceptible curvature, with the decorative ply on the concave side of the curve and its machine direction at right angles to the direction of curvature of the completed decorative paper board.

The stress between the facing laminate and backing laminates and the core or between the facing laminate and the remainder of the body of this decorative laminated board, as the case may be, is created in the method of this invention by the manner in which the outer laminates or laminate is laminated to the remainder of the body of the laminated board, as well as by the position of the machine direction of its paper sheets at right angles to the machine direction of the plies of the core or of the remainder of the plies of the lamination, including both those of the central core and those of the backing laminate. The outer laminate is affixed to the surface of the central core, while it is relatively moist and then dried after the adhesive by which it is attached to the central core has set. This outer laminate will preferably have a moisture content equal to or greater than that of the central core immediately after the adhesive film which bonds it to the central core has developed sufficient strength to resist substantial lateral stress. As the laminate is dried after the adhesive has set, the laminate shrinks to a greater extent along the cross-machine direction of its component sheets, than the plies of the central core shrink in their machine direction. Since the shrinkage of the outer laminate is greater in the same direction as the lesser shrinkage of the central core, a substantial stress is developed between the outer laminate and the central core, which takes the form of tension in the cross-machine direction of the paper sheets of the laminate. As already noted, in the alternative embodiment in which only the facing laminate is positioned with its machine direction at right angles to the machine directions of the plies of the core, this tension causes the finished laminate to assume a slight curvature with the facing laminate on the concave side of the curve. The direction of the curvature is in the direction of the tension which is in the cross-machine direction of the facing sheets.

In the use of the decorated laminated paper board in accordance with this invention for lining the interior of the top of a vehicle, such as, for example, the interior of the top of an automobile, a panel or, more usually, a series of panels of the laminate are affixed in position by means well known to the art on the inside of the top of the vehicle, with the decorative side of the board on the lower side. Each panel is supported along its edges when in position in the head lining.

In the case of the balanced laminated board, the stresses within the board structure counteract the normal tendency of an ordinary panel board to sag under its own weight, with the result that the head lining made of such laminated boards retain their original configuration with no perceptible sagging over long periods of time.

A head lining made up of panels of the unbalanced laminated board in accordance with this invention has an off-setting curvature which overcomes sagging over long periods of time as a result of the greater shrinkage of the facing laminate after it has been applied to the board. Each panel initially has a curvature which matches that of the head lining as a whole so that the head lining as a whole appears to have a perfectly smooth curve with no unsightly scalloping caused by sagging between supports.

The unbalanced board in accordance with this invention may be produced which although initially curved, will flatten out when placed in service in an automotive head lining and still not sag. Such an unbalanced board may be produced by building into the board a tension on the facing laminate which counterbalances the tendency of the board to sag, but allows the weight of the board to flatten out its curvature. The tension which is built into the board is determined by the relative strengths of the facing laminate and the remainder of the board. In the case of any given paper stock, the thicker the sheets of the facing laminate, the greater the tension they are capable of exerting. By the selection of the thickness of the paper used in the facing laminate, in view of the thickness of the remainder of the board, the tension can be adjusted to permit the weight of the board to flatten out its curvature but to prevent any sagging.

Figure 2:
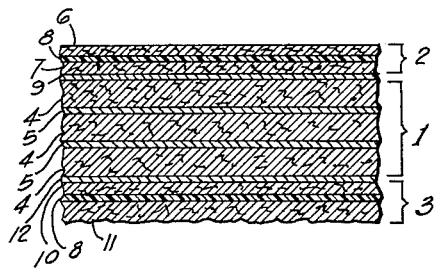
Figure 3:
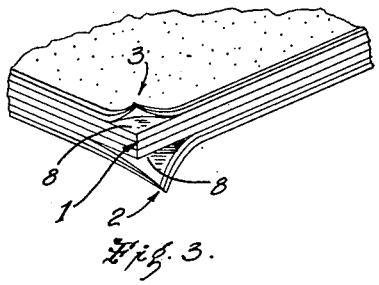
Figure 4:
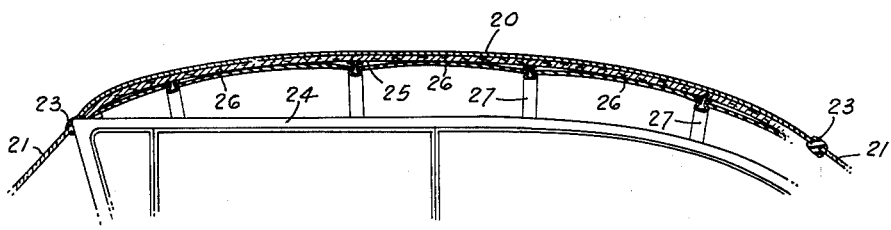
Figure 5:
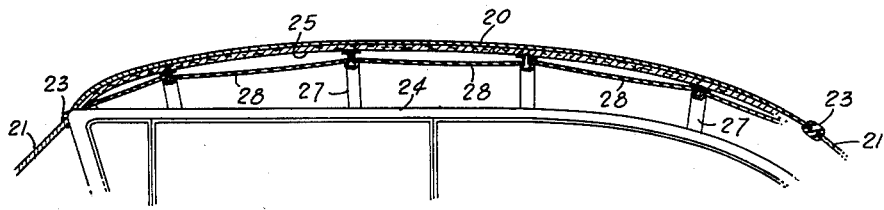

Having indicated the general nature of the decorated laminated paper board of this invention and the method by which it is produced, both the product and the method by which it is produced will be described in detail with reference to the accompanying drawings in which like reference characters are used to refer to like parts wherever they may occur. In the drawings:

FIGURE 1 is a fragmentary, exploded and enlarged cross-sectional view ilustrating the intermediate laminates which are adhered together to form the decorative laminated paper board in accordance with this invention, FIGURE 2 is an enlarged, fragmentary, cross-sectional view of this decorative laminated paper board, FIGURE 3 is a perspective view of the decoration panel board in accordance with this invention, showing its decorative surface facing upwardly, FIGURE 4 is a schematic cross-sectional view of an automobile head liner made of panels of the decorative unbalanced laminated paper board of this invention, in which the imperceptible upward curvature of each individual panel is greatly exaggerated, and FIGURE 5 is a schematic cross-sectional view of an automobile head liner made up of panels of the prior art decorative laminated paper board after it has been in service and developed sag, in which the sagging is exaggerated for the purpose of clarity.

Referring specifically to FIGURES 1, 2 and 3, it will be seen that the decorative panel board in accordance with this invention consists of a central core lamination 1, a backing lamination 2 and a facing lamination 3. The core lamination consists of a plurality of plies of paper board 4 . . . 4 adhered to each other by layers of adhesive 5 . . . 5. Although FIGURES 1, 2 and 3 show a core lamination formed from three plies of paper board, it will be understood that it may be formed from any desired number of plies of the paper board.

The paper board 4 is perferably of a strong, carton board type. It may, for example, be made from kraft paper stock. It desirably contains a small percentage of beater starch to maintain an optimum moisture content in the board. Further, it may contain rosin size in relatively high proportions, i.e., is "hard" sized, to render it water repellant. Alternative to the rosin size or in combination therewith it may contain a wax size to render it water repellant. Each of the plies 4 . . . 4 may be of any desired thickness. In practice, we have found that a board having a thickness of 20 one-thousandths of an inch is satisfactory for this purpose. It is desirable to use paper board which is thin enough to be rolled without breaking, since it is desirable to use rolls of the paper board in the production of the core lamination. As a practical matter, this limits the maximum thickness of the plies to about 40 one-thousandths of an inch. The paper board plies 4 . . . 4 are positioned with their machine directions parallel to each other.

The adhesive layers 5, 5 may be of any water insoluble adhesive of the types used in the paper industry. Thus, it may be a cooked starch modified with a urea-formaldehyde condensation product. It may be a polyvinyl adhesive, or it may be a protein such as, for example, soya bean protein or casein.

The backing laminate consists of two sheets of paper 6 and 7 adhered together by a continuous waterproof film 8 of a flexible thermoplastic resin. Polyethylene and polypropylene resins are excellent for this purpose, although many other synthetic resins may be used. This film should have a thickness of at least 0.75 one-thousandths of an inch. We have found that no advantage is gained by the use of a film thicker than 1.25 thousandths of an inch, although there is no reason other than cost, why thicker films should not be used. The sheets of paper 6 and 7 may have a basis weight within the range of about 20 pounds to about 40 pounds and is preferably a paper which has been specially treated to render it water resistant.

The backing lamination, as shown by FIGURES 2 and 3, is adhered to the central core lamination 1 by a layer of water-proof adhesive 9. This adhesive may be any one of those mentioned hereinbefore as forming the layers 5, 5 of the central core 1.

The machine directions of the paper sheets 6 and 7 are in parallel direction in the backing lamination. In one embodiment of this invention they are positioned at right angles to the machine direction of the plies of the core lamination 1 to form a balanced sheet. In the other embodiment of this invention, they are positioned with their machine directions parallel to those of the central core lamination to form an unbalanced sheet.

The facing lamination 3, consists of two sheets of paper 10 and 11 adhered together by a continuous, waterproof film 8 of a thermoplastic resin. Like the film 8 of the backing laminate, this film may be polyethylene, polypropylene or any one of many other flexible, waterproof thermoplastic resin, and should be at least 0.75 thousandths of an inch thick. The paper sheet 10 may, for example, be a kraft paper having a basis weight within the range of about 20 pounds to about 40 pounds. The paper sheet 11 may, for example, be a well sized, bleached kraft paper or a book paper having a basis weight within the range of about 50 pounds to about 80 pounds. It may be impregnated with a rubber or synthetic rubber latex to render it scuff resistant. It has its outer surface decorated by printing or embossing or by a combination of both printing and embossing. The surface of this sheet which is decorated may also carry a lacquer coating. The machine directions of the sheets 9 and 10 are positioned parallel to each other.

The facing laminate 3 is adhered to the surface of the central core lamination 1, by a layer of a waterproof adhesive 12 which may be any one of those mentioned hereinbefore as the layers 5, 5 of the core lamination. The parallel directions of its sheets 9 and 10 are positioned at right angles to the parallel directions of the machine directions of the paper board plies 4 . . . 4 of the core lamination 1 in both the balanced sheet and the unbalanced sheet embodiments of our invention.

In the method of this invention, the core lamination 1, the backing laminate 2 and the facing laminate 3 are prepared in separate and distinct operations and then adhered together to produce the finished decorative panel board. In each operation, the plies which are adhered together are initially in the form of a rolled, continuous web. After the plies have been adhered together, the respective laminates are cut into sections, and sections of the backing laminate 2 and of the facing laminate 3 adhered to the surfaces of the core laminate 1. In the production of the core laminate it is desirable to form the adhesive layers 5, 5 by the setting of an aqueous type of an adhesive and it may be noted that the adhesives mentioned hereinbefore as forming the adhesive layers 5, 5, although waterproof when set, are suspensions or solutions in water when used. The core laminate 1 is too stiff to be rolled after the adhesive layers 5, 5 have set and must be cut into sections before it receives the backing and the facing laminates.

Both the backing laminate 2 and the facing laminate 1 are formed by continuously extruding a film of the thermoplastic resin, while in the molten or semi-molten condition, into the nip formed by bringing together two continuous webs of paper which are moving at the same speed. In the case of the backing laminate, the moving webs of paper are the papers 6 and 7 described above, while in the case of the facing laminate they are the paper 10 and the paper 11 in its decorated or undecorated condition. The extruded film of synthetic resin hardens upon cooling to form the film 8 of the backing laminate 2 or of the facing laminate 3, as the case may be. This film 8 serves two functions in each of these laminates. It acts as an adhesive to attach the paper sheets of the laminates together and functions as a barrier to both water and moisture vapor.

The outer surface of the sheet 10 may be decorated by embossing, printing or by a combination of printing and embossing, and if desired, given a lacquer coating, either before or after it is laminated to the sheet 8 by the synthetic resin film 8. However, to obtain the benefit of one of the particularly advantageous features of this invention, it must be decorated before the facing laminate 3, as a whole, is adhered to the core lamination 1.

As noted above, after the core lamination 1, the backing lamination 2 and the facing lamination 3 have been prepared in separate operations, they are cut into sheets of the same dimensions and adhered together with the backing laminate 2 on one surface of the core lamination 1 and with the facing lamination 3 on the other surface of the core lamination 1, by the use of an aqueous adhesive which sets to water proof films 9 and 12, respectively.

The backing lamination 2 may be adhered to the core lamination 1 with its machine direction either at right angles to or parallel with the machine directions of the plies of the core lamination, to produce a balanced or an unbalanced board, as may be desired. The facing laminate 3 is adhered to the core lamination 1 with the machine directions of its sheets at right angles to the machine directions of the paper board plies of the core lamination 1.

The method in accordance with this invention presents a definite advantage over the method which has heretofore been employed in the production of decorated laminated paper board. Heretofore, it has been the practice to form a central core lamination and adhere sheets of paper directly to each of the surfaces of the central core by a film of, for example, a polyethylene resin. The surface of the facing sheet of the lamination is then decorated, by the various operations necessary to secure the desired appearance. The laminated board is too stiff to be rolled, so that it must be cut into sections before the decorating steps can be carried out. These decorating steps must be carried out at speeds which are quite slow as compared with that at which a continuous web can be handled.

The importance of the decoration of the surface of the facing sheet 11 either before or after it is laminated to the sheet 12 to form the facing lamination 3, and while it is still in the form of a continuous web of paper which can be processed at high speeds can be fully appreciated from the fact that the decoration of the facing sheet involves at least one printing operation, and more often two such operations, at least one embossing operation and usually a lacquer coating operation. Thus, a total of four separate operations is usually required for the decoration of the face sheet.

FIGURES 4 and 5 illustrate a cross-section of a conventional type roof construction used in one well known make of automobiles which utilizes head liner panels of the type with which this invention is concerned. An automobile metal roof of conventional construction is indicated by the numeral 20. The glass windshield 21 and the rear glass window 22 are each shown as mounted within a suitable gasket type of frame element 23. The side margins of the metal roof are bent over upon themselves forming with a supplemental strip which extends along the longitudinal side margin of the roof and above the door and window frames of the side walls. This box-like structure has a series of inwardly extending lugs punched from its inner side which function as supports for the ends of the head liner panels. The lugs and the ends of the head liner panels are covered by a molding strip 24. The door and window frames or body pillows are formed at their upper ends to engage the box-like roof support and are usually welded thereto. A layer 25 of an insulating material is secured to the underside of the roof 20.

A head lining assembly utilizing the decorative laminated paper board in accordance with this invention, shown by FIGURE 4, may comprise a plurality of transversely extending panels 26 . . . 26 of the decorative laminated paper board. The panels 26 . . . 26 have a transverse dimension sufficiently greater than the transverse dimension between the ledges formed by the lugs punched from the longitudinal box-like sections mentioned hereinbefore so that when the panels are sprung upwardly into a bowed shape as shown by FIGURE 4 and their ends positioned on the supporting lugs, the panels are positioned against the layer 25 of the insulating material. The linear margins of the head liner panels are held in flush alignment against the insulating layer 25 by panel matching strips 27 . . . 27 of known design. It will be noted that in this head liner assembly, the ends, edges and each of the linear margins of the decorative, laminated paper board panels are supported, but that there is no other support for each individual panel.

In the head liner illustrated by FIGURE 4 in which the decorative laminated paper board, in accordance with this invention, whether of the balanced board or the unbalanced board type, is used for the individual panels, the individual panels do not sag when in service, as is too frequently the case with the prior art laminated paper panels. As fully explained in the foregoing, this resistance to sagging is provided by the stress which is built into the lamination.

FIGURE 5 illustrates a head liner made up the prior art decorative laminated panels 28 . . . 28 which has undergone the sagging after a period of service, which has been more or less typical of such panels. In this figure the usual sagging is exaggerated for the purpose of clarity in the drawing. However, in the case of such an automobile head lining which has been in service for any extended period of time, this sagging becomes quite noticeable and seriously detracts from the appearance of the head liner.

In the foregoing, many details have been given concerning our decorative laminated paper board for the purpose of fully explaining the nature of our invention. It will be understood, however, many changes can be made in these details without departing from the spirit of our invention.

We claim:

1. A decorative laminated paper board comprising an internal paper board core lamination consisting of a plurality of sheets of a paper board each of which is adhered to an adjacent sheet by a layer of a water-insoluble adhesive, with its machine direction in parallel alignment to that of the adjacent sheet; the said paper board core lamination having adhered to one of its surfaces by a layer of a water-insoluble adhesive deposited from an aqueous solution a backing paper lamination consisting of two sheets of paper adhered together with their machine directions in parallel alignment by a waterproof film of a thermoplastic resin; and the said paper board core lamination having adhered to its opposite surface by a layer of a water-insoluble adhesive deposited from an aqueous solution a facing paper lamination consisting of two sheets of paper adhered together with their machine directions in parallel alignment by a waterproof film of a thermoplastic resin, the said facing lamination having its outer surface decorated, being positioned with the parallel machine directions of its sheets at right angles to the parallel machine directions of the sheets of the said paper board core lamination, and being under tension in its cross-machine direction created by the greater shrinkage of the said facing laminate in the cross-machine direction than the shrinkage of the core lamination in its machine direction upon drying after being adhered to the said core lamination, which tension causes stress within the body of the decorative laminated paper board.

2. A decorative laminated paper board comprising an internal paper board core lamination consisting of a plurality of sheets of a paper board each of which is adhered to an adjacent sheet by a layer of a water-insoluble adhesive with its machine direction in parallel alignment to that of the adjacent sheet, the said paper board core lamination having adhered to one of its surfaces by a layer of a water-insoluble adhesive deposited from an aqueous solution a backing paper lamination consisting of two sheets of paper adhered together with their machine directions in parallel alignment by a waterproof film of a thermoplastic resin, with the parallel machine directions of its sheets in parallel alignment with the machine directions of the sheets of the said paper board core lamination; and the said paper board core lamination having adhered to its opposite surface by a layer of a water-insoluble adhesive deposited from an aqueous solution a facing paper lamination consisting of two sheets of paper adhered together with their machine directions in parallel alignment by a waterproof film of a thermoplastic resin, and the said facing lamination having its outer surface decorated, being positioned with the parallel machine directions of its sheets at right angles to the parallel machine directions of the sheets of the said paper board core lamination and being under tension in its cross-machine direction created by the greater shrinkage of the said facing laminate in a cross-machine direction than the shrinkage of the core lamination in its machine direction after being adhered to the said core lamination, which tension causes an unbalanced stress within the body of the decorative laminated paper board, which tends to cause the lamination as a whole to assume a slight curvature in the cross-machine direction of the facing lamination with the decorative surface on the concave side of the curve.

3. A decorative laminated paper board comprising an internal paper board core lamination consisting of a plurality of sheets of a paper board each of which is adhered to an adjacent sheet by a layer of a water-insoluble adhesive with its machine direction in parallel alignment to that of the adjacent sheet, the said paper board core lamination having adhered to one of its surfaces by a layer of a water-insoluble adhesive deposited from an aqueous solution, a backing paper lamination consisting of two sheets of paper adhered together with their machine directions in parallel alignment by a waterproof film of polyethylene resin, with the parallel machine directions of its sheets in parallel alignment with the machine directions of the sheets of the said paper board core lamination; and the said paper board core lamination having adhered to its opposite surface by a layer of a water-insoluble adhesive deposited from an aqueous solution a facing paper lamination consisting of two sheets of paper adhered together with their machine directions in parallel alignment by a waterproof film of polyethylene resin, the said facing lamination having its outer surface decorated by embossing and by printing, being positioned with the parallel machine directions of its sheets at right angles to the parallel machine directions of the sheets of the said paper board core lamination and being under tension in its cross-machine direction created by the greater shrinkage of the said facing laminate in the cross-machine direction than the shrinkage of the core lamination in its machine direction after being adhered to the said core lamination, which tension causes an unbalanced stress within the body of the decorative laminated paper board which tends to cause the lamination as a whole to assume a slight curvature in the cross-machine direction of the facing lamination with the decorative surface on the concave side of the curve.

4. A decorative laminated paper board comprising an internal paper board core lamination consisting of a plurality of sheets of a paper board each of which is adhered to an adjacent sheet by a layer of a water-insoluble adhesive with its machine direction in parallel alignment to that of the adjacent sheet, the said paper board core lamination having adhered to one of its surfaces by a layer of a water-insoluble adhesive deposited from an aqueous solution a backing paper lamination consisting of two sheets of paper adhered together with their machine directions in parallel alignment by a waterproof film of polypropylene resin, with the parallel machine directions of its sheets in parallel alignment with the machine directions of the sheets of the said paper board core lamination; and the said paper board core lamination having adhered to its opposite surface by a layer of a water-insoluble adhesive deposited from an aqueous solution a facing paper lamination consisting of two sheets of paper adhered together with their machine directions in parallel alignment by a waterproof film of polypropylene resin, the said facing lamination having its outer surface decorated by embossing and by printing, being positioned with the parallel machine directions of its sheets at right angles to the parallel machine directions of the sheets of the said paper board core lamination, and being under tension in its cross-machine direction created by the greater shrinkage of the said facing laminate in the cross-machine direction than the shrinkage of the core lamination in its machine direction after being adhered to the said lamination, which tension causes an unbalanced stress within the body of the decorative laminated paper board which tends to cause the lamination as a whole to assume a slight curvature in the cross-machine direction of the facing lamination with the decorative surface on the concave side of the curve.

5. A decorative laminated paper board comprising an internal paper board core lamination consisting of a plurality of sheets of a paper board each of which is adhered to an adjacent sheet by a layer of a water-insoluble adhesive with its machine direction in parallel alignment to that of the adjacent sheet; the said paper board core lamination having adhered to one of its surfaces by a layer of a water-insoluble adhesive deposited from an aqueous solution, a backing paper lamination consisting of two sheets of paper adhered together with their machine directions in parallel alignment by a waterproof film of a thermoplastic resin, with the parallel machine directions of its sheets aligned at right angles to the machine directions of the sheets of the said paper board core lamination and being under tension in its cross-machine direction created by its greater shrinkage in the cross-machine direction than the shrinkage of the core lamination in its machine direction after being adhered to the said core lamination, and the said paper board core lamination having attached by a layer of a water-insoluble adhesive deposited from an aqueous solution to its opposite surface a facing paper lamination consisting of two sheets of paper adhered together with their machine directions in parallel alignment by a waterproof film of a thermoplastic resin, the said facing lamination having its outer surface decorated, being positioned with the parallel machine directions of its sheets at right angles to the parallel machine directions of the sheets of the said paper board core lamination, and being under tension in its cross-machine direction created by the shrinkage of the said facing laminate in the cross-machine direction than the shrinkage of the core lamination in its machine direction after being adhered to the said core lamination, which tension substantially balances the stress within the body of decorative laminated board created by the tension of the said backing laminate.

6. A decorative laminated paper board comprising an internal paper board core lamination consisting of a plurality of sheets of a paper board each of which is adhered to an adjacent sheet by a layer of a water-insoluble adhesive with its machine direction in parallel alignment to that of the adjacent sheet, the said paper board core lamination having adhered to one of its surfaces by a layer of a water-insoluble adhesive deposited from an aqueous solution; a backing paper lamination consisting of two sheets of paper adhered together with their machine directions in parallel alignment by a waterproof film of polyethylene resin, with the parallel machine directions of its sheets aligned at right angles to the machine directions of the sheets of the said paper board core lamination and being under tension in its cross-machine direction created by its greater shrinkage in the cross-machine direction than the shrinkage of the core lamination in its machine direction after being adhered to the said core lamination, and the said paper board core lamination having attached to its opposite surface a facing paper lamination consisting of two sheets of paper adhered together with their machine directions in parallel alignment by a waterproof film of polyethylene resin, the said facing lamination having its outer surface decorated by embossing and by printing, being positioned with the parallel machine directions of its sheets at right angles to the parallel machine directions of the sheets of the said paper board core lamination, and being under tension in its cross-machine direction created by the greater shrinkage of the said facing laminate in its cross-machine direction than the shrinkage of the core lamination in its machine direction after being adhered to the said core lamination, which tension substantially balances the stress within the body of the decorative laminated board created by the tension of the said backing laminate.

7. A decorative laminated paper board comprising an internal paper board core lamination consisting of a plurality of sheets of a paper board each of which is adhered to an adjacent sheet by a layer of a water-insoluble adhesive with its machine direction in parallel alignment to that of the adjacent sheet, the said paper board core lamination having adhered to one of its surfaces by a layer of a water-insoluble adhesive deposited from an aqueous solution; a backing paper lamination consisting of two sheets of paper adhered together with their machine directions in parallel alignment by a waterproof film of polypropylene resin, with the parallel machine directions of its sheets aligned at right angles to the machine directions of the sheets of the said paper board core lamination and being under tension in its cross-machine direction created by its greater shrinkage in the cross-machine direction than the shrinkage of the core lamination in its machine direction after being adhered to the said core lamination, and the said paper board core lamination having attached to its opposite surface a facing paper lamination consisting of two sheets of paper adhered together with their machine directions in parallel alignment by a waterproof film of polypropylene resin, the said facing lamination having its outer surface decorated by embossing and by printing, being positioned with the parallel machine directions of its sheets at right angles to the parallel machine directions of the sheets of the said paper board core lamination, having its outer surface decorated and being under tension in its cross-machine direction created by the greater shrinkage of the said facing laminate in its cross-machine direction than the shrinkage of the core lamination in its machine direction after being adhered to the said core lamination, which tension substantially balances the stress within the body of the decorative laminated board created by the tension of the said backing laminate.

8. A method for the production of a decorative laminated paper board which comprises the steps of laminating a plurality of plies of flexible carton board to form a stiff central core lamination by bringing the said plies together with their machine directions in parallel alignment and adhering them together by a layer of a water-base adhesive which becomes waterproof upon setting and cutting the said core lamination into sections; of laminating a pair of plies of paper to form a backing lamination by bringing together the said plies with their machine directions in parallel alignment, adhering them together by a film of a flexible, thermoplastic resin and cutting the said backing lamination into sections; of laminating another pair of plies of paper to form a facing lamination by bringing together the said plies with their machine directions in parallel alignment, adhering them together by a film of a flexible, thermoplastic resin and cutting the said facing lamination into sections; and, finally, the steps of laminating the sections of the said backing lamination to one of the surfaces of the sections of the core lamination by a layer of a water-base adhesive which becomes waterproof upon setting and of laminating the sections of the said facing lamination to the reverse surfaces of the sections of the core lamination by bringing the said sections together with their machine directions at right angles to each other and adhering them together by a layer of a water base adhesive to form sheets of a decorative laminated paper board which is under internal stress caused by tension between the facing lamination and the core lamination created by the greater shrinkage of the facing lamination in its cross-machine direction than the strinkage of the core lamination in its machine direction after the two laminations are adhered together.

9. A method for the production of a decorative laminated paper board which comprises the steps of laminating a plurality of plies of flexible carton board to form a stiff central core lamination by bringing the said plies together with their machine directions in parallel alignment and adhering them together by a layer of a water-base adhesive which become water-proof upon setting and cutting the said core lamination into sections; of laminating a pair of plies of paper to form a backing lamination by bringing together the said plies with their machine directions in parallel alignment, adhering them together by a film of a flexible, thermoplastic resin and cutting the said backing lamination into sections; of laminating another pair of plies of paper to form a facing lamination by bringing together the said plies with their machine directions in parallel alignment, adhering them together by a film of a flexible, thermoplastic resin and cutting the said facing lamination into sections; and, finally, the steps of laminating the sections of the said backing lamination to one of the surfaces of the sections of the core lamination by bringing the said sections together with their machine directions in parallel alignment and adhering them together by a layer of a water-base adhesive which becomes water-proof upon setting and of laminating the sections of the said facing lamination to the reverse surfaces of the sections of the core lamination by bringing the said sections together with their machine directions at right angles to each other and adhering them together by a layer of a water base adhesive to form sheets of a decorative laminated paper board which is under an unbalanced internal stress caused by tension between the facing lamination and the core lamination created by the greater shrinkage of the facing lamination in its cross-machine direction than the shrinkage of the core lamination in its machine direction after the two laminations are adhered together.

10. A method for the production of a decorative laminated paper board which comprises the steps of laminating a plurality of plies of flexible carton board to form a stiff central core lamination by bringing the said plies together with their machine directions in parallel alignment and adhering them together by a layer of a water-base adhesive which becomes water-proof upon setting and cutting the said core lamination into sections; of laminating a pair of plies of paper to form a backing lamination by bringing together the said plies with their machine directions in parallel alignment, adhering them together by a film of a flexible, thermoplastic resin and cutting the said backing lamination into sections; of laminating another pair of plies of paper to form a facing lamination by bringing together the said plies with their machine directions in parallel alignment, adhering them together by a film of a flexible, thermoplastic resin and cutting the said facing lamination into sections; and, finally, the steps of laminating the sections of the said backing lamination to one of the surfaces of the core lamination by bringing the said sections together with their machine directions at right angles to each other and adhering them together by a layer of a water-base adhesive which becomes waterproof upon setting and of laminating the sections of the said facing lamination to the reverse surfaces of the sections of the core laminations by bringing the said sections together with their machine directions at right angles to each other and adhering them together by a layer of a water base adhesive to form sheets of a decorative laminated paper board which is under a balanced internal stress caused by tensions between the backing lamination and the facing lamination respectively, and the core lamination created by the greater shrinkages of the backing lamination and of the facing lamination respectively, in their respective cross-machine directions than the shrinkage of the core lamination in its machine direction, after the three laminations are adhered together.

11. A method for the production of a decorative laminated paper board which comprises the steps of laminating a plurality of plies of flexible carton board to form a stiff central core lamination by bringing the said plies together with their machine directions in parallel alignment and adhering them together by a layer of a water-base adhesive which become waterproof upon setting and cutting the said core lamination into sections; of laminating a pair of plies of paper to form a backing lamination by bringing together the said plies with their machine directions in parallel alignment, adhering them together by a film of a flexible, thermoplastic resin and cutting the said backing lamination into sections; of laminating another pair of plies of paper to form a facing lamination by bringing together the said plies with their machine directions in parallel alignment, adhering them together by a film of a flexible, thermoplastic resin, of decorating one surface of the facing lamination and cutting the said facing lamination into sections, and, finally, the steps of laminating the sections of the said backing lamination to one of the surfaces of the core lamination by bringing the said sections together with their machine directions in parallel alignment and adhering them together by a layer of a water-base adhesive which becomes waterproof upon setting and of laminating the sections of the said facing lamination to the reverse surfaces of the sections of the core lamination by bringing the said sections together with their machine directions at right angles to each other and with the decorated surface of the facing lamination facing outwardly, and adhering them together by a layer of a water base adhesive to form a decorative laminated paper board which is under an unbalanced internal stress caused by tension between the facing lamination and the core lamination created by the greater shrinkage of the facing lamination in its cross-machine direction than the shrinkage of the core lamination in its machine direction after the two laminations are adhered together.

12. A method for the production of a decorative laminated paper board which comprises the steps of laminating a plurality of plies of flexible carton board to form a stiff central core lamination by bringing the said plies together with their machine directions in parallel alignment and adhering them together by a layer of a water-base adhesive which become waterproof upon setting and cutting the said core lamination into sections; of laminating a pair of plies of paper to form a backing lamination by bringing together the said plies with their machine directions in parallel alignment, adhering them together by a film of a flexible, thermoplastic resin and cutting the said backing lamination into sections; of laminating another pair of plies of paper to form a facing lamination by bringing together the said plies with their machine directions in parallel alignment, adhering them together by a film of a flexible, thermoplastic resin, of decorating one surface of the said facing lamination and cutting the said facing lamination into sections, and, finally, the steps of laminating the sections of the said backing lamination to one of the surfaces of the core lamination by bringing the said sections together with their machine directions at right angles to each other and adhering them together by a layer of a water-base adhesive which become waterproof upon setting and of laminating the sections of the said facing lamination to the reverse surface of the sections of the core lamination by bringing the said sections together with their machine directions at right angles to each other and with the decorated surface of the facing lamination facing outwardly and adhering them together by a layer of a water base adhesive to form a decorative laminated paper board which is under a balanced internal stress caused by tensions between the backing lamination and the facing lamination respectively, and the core lamination created by the greater shrinkages of the backing lamination and of the facing lamination respectively, in their respective cross-machine directions than the shrinkage of the core lamination in its machine direction, after the three laminations are adhered together.

13. A method for the production of a decorative laminated paper board which comprises the steps of laminating a plurality of plies of flexible carton board to form a stiff central core lamination by bringing the said plies together with their machine directions in parallel alignment and adhering them together by a layer of a water-base adhesive which become waterproof upon setting and cutting the said core lamination into sections; of laminating a pair of plies of paper to form a backing lamination by bringing together the said plies with their machine directions in parallel alignment, adhering them together by a film of a flexible, thermoplastic resin and cutting the said backing lamination into sections; of decorating one surface of a paper ply and laminating it to another paper ply with its decorated surface exposed to form a facing lamination by bringing together the said plies with their machine directions in parallel alignment, adhering them together by a film of a flexible, thermoplastic resin, and cutting the said facing lamination into sections, and, finally, the steps of laminating the sections of the said backing lamination to one of the surfaces of the core lamination by bringing the said sections together with their machine directions at right angles to each other and adhering them together by a layer of a water-base adhesive which become waterproof upon setting and of laminating the sections of the said facing lamination to the reverse surface of the sections of the core lamination by bringing the said sections together with their machine directions at right angles to each other and with the decorated surface of the facing lamination facing outwardly and adhering them together by a layer of a water base adhesive to form a decorative laminated paper board which is under a balanced internal stress caused by tensions between the backing lamination and the facing lamination respectively, and the core lamination created by the greater shrinkages of the backing lamination and of the facing lamination respectively, in their respective cross-machine directions than the shrinkage of the core lamination in its machine direction, after the three laminations are adhered together.

14. A method for the production of a decorative laminated paper board which comprises the steps of laminating a plurality of plies of flexible carton board to form a stiff central core lamination by bringing the said plies together with their machine directions in parallel alignment and adhering them together by a layer of a water-base adhesive which become waterproof upon setting and cutting the said core lamination into sections; of laminating a pair of plies of paper to form a backing lamination by bringing together the said plies with their machine directions in parallel alignment, adhering them together by a film of a flexible, thermoplastic resin and cutting the said backing lamination into sections; of decorating one surface of a paper ply and laminating it to another paper ply with its decorated surface exposed to form a facing laminate by bringing together the said plies with their machine directions in parallel alignment, adhering them together by a film of a flexible, thermoplastic resin, cutting the said facing lamination into sections, and, finally, the steps of laminating the sections of the said backing lamination to one of the surfaces of the core lamination by bringing the said sections together with their machine directions at right angles to each other and adhering them together by a layer of a water-base adhesive which become waterproof upon setting and of laminating the sections of the said facing lamination to the reverse surface of the sections of the core lamination by bringing the said sections together with their machine directions at right angles to each other and with the decorated surface of the facing lamination facing outwardly and adhering them together by a layer of a water base adhesive to form a decorative laminated paper board which is under a balanced internal stress.

References Cited in the file of this patent
UNITED STATES PATENTS

| | | |
|---|---|---|
| 1,427,812 | Hirt | Sept. 5, 1922 |
| 2,656,296 | Grangaard | Oct. 20, 1953 |
| 2,801,198 | Norris et al. | July 30, 1957 |
| 2,894,292 | Gramelspacher | July 14, 1959 |
| 2,899,349 | Jenkins | Aug. 11, 1959 |

UNITED STATES PATENT OFFICE
CERTIFICATE OF CORRECTION

Patent No. 3,042,563 July 3, 1962

Walter V. Shearer et al.

It is hereby certified that error appears in the above numbered patent requiring correction and that the said Letters Patent should read as corrected below.

Column 8, line 29, for "daminate" read -- laminate --; column 9, line 27, after "said" insert -- core --.

Signed and sealed this 30th day of October 1962.

SEAL)
Attest:

ERNEST W. SWIDER
Attesting Officer

DAVID L. LADD
Commissioner of Patents